United States Patent
Provost et al.

(10) Patent No.: US 9,967,595 B1
(45) Date of Patent: May 8, 2018

(54) SYSTEMS AND METHODS FOR IN-FLIGHT ENTERTAINMENT CONTENT LOADING AND TRANSFER

(71) Applicants: Gauthier Provost, Singapore (SG); Petrus Lai, Singapore (SG); Sakthivel Jayaraman, Bangalore (IN)

(72) Inventors: Gauthier Provost, Singapore (SG); Petrus Lai, Singapore (SG); Sakthivel Jayaraman, Bangalore (IN)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days. days.

(21) Appl. No.: 14/868,300

(22) Filed: Sep. 28, 2015

(51) Int. Cl.
*H04N 21/214* (2011.01)
*H04N 21/61* (2011.01)
*H04N 21/238* (2011.01)

(52) U.S. Cl.
CPC ....... *H04N 21/2146* (2013.01); *H04N 21/238* (2013.01); *H04N 21/6143* (2013.01)

(58) Field of Classification Search
None
See application file for complete search history.

(56) References Cited

U.S. PATENT DOCUMENTS

| | | | |
|---|---|---|---|
| 8,667,577 B2* | 3/2014 | Challener | G06F 21/32 713/186 |
| 2005/0129239 A1* | 6/2005 | Farley | H04B 7/18502 380/270 |
| 2009/0081947 A1* | 3/2009 | Margis | H04B 7/18508 455/3.02 |
| 2010/0008053 A1* | 1/2010 | Osternack | H05K 7/1424 361/752 |
| 2010/0187903 A1* | 7/2010 | Diab | B60R 16/023 307/9.1 |
| 2014/0226983 A1* | 8/2014 | Vargas | H04B 10/116 398/66 |
| 2015/0245109 A1* | 8/2015 | Couleaud | H04N 21/2146 725/77 |

* cited by examiner

*Primary Examiner* — Omar S Parra
(74) *Attorney, Agent, or Firm* — Donna P. Suchy; Daniel M. Barbieri (57) ABSTRACT

In some aspects, the disclosure is directed to systems and methods for transferring in-flight entertainment content. A content loading panel at a first location within an aircraft may load in-flight entertainment content from at least one of a plurality of types of portable content storage devices. A content server at a second location within the aircraft, may be in communication with the content loading panel via a physical connection. The content server may receive, via the physical connection, the in-flight entertainment content loaded via the content loading panel. The content server may store the received in-flight entertainment content. The content server may provision at least a portion of the stored in-flight entertainment content to a plurality of wireless access points located in the aircraft.

20 Claims, 10 Drawing Sheets

Fig. 2G

SYSTEMS AND METHODS FOR IN-FLIGHT ENTERTAINMENT CONTENT LOADING AND TRANSFER

BACKGROUND

In-flight information distribution systems may present an occupant or passenger of an aircraft with a variety of in-flight entertainment content, such as information related to the flight of an aircraft. An example of an in-flight distribution system is the Rockwell Collins' Airshow® system configurable to provide, for instance, moving map displays where each such display may present a colorful and graphical flight path of the aircraft (both the projected flight path and the already-flown ground track) against the background of colorful two-dimensional or three-dimensional moving map. An in-flight entertainment system may also provide access to audiovisual content and intranet/Internet content.

SUMMARY

In one aspect, embodiments of the inventive concepts disclosed herein are directed to an in-flight entertainment (IFE) system with a content loading component and a content server communicatively arranged and located at different locations within an aircraft. The content loading component is sometimes referred to as a cabin control panel (CCP) or a content loading panel. The content server is sometimes referred to as a FFP-2. The in-flight entertainment system provides a flexible platform for delivering services to wireless passenger mobile devices, and the services can include for instance those for audio/video on demand (AVOD), moving map display, games, advertising, pay per view, local intranet content, shopping (e.g., duty free shopping), credit card payment, e-reader content (e.g., magazines), and airline defined custom applications.

In a further aspect, embodiments of the inventive concepts disclosed herein are directed to methods and systems for in-flight entertainment content loading and transfer between the content loading component and the content server. The content loading component can provide high speed loading and background content loading. The content loading component can include a communications processing board designed to speed up the loading of media content (e.g., 512 GB in minutes), using various connectors/devices for transfer. For instance, the content loading component can support an Ethernet loader, SD cards, SSD and/or USB based devices, for content loading. The content loading component allows loading and transferring of content to the content server, which can include a high speed media server, for storage and streaming to one or more wireless access points (WAPs) distributed within an aircraft. The content server may be located in an electronics/engineering bay area, which allows for air cooling of the high speed media server, while the content loading component can be a compact interface or module that can reside in the cabin for accessibility.

In a further aspect, embodiments of the inventive concepts disclosed herein are directed to an avionics system for transferring in-flight entertainment content. The avionics system may include a content loading panel at a first location within an aircraft, that loads in-flight entertainment content from at least one of a plurality of types of portable content storage devices. The avionics system may include a content server at a second location within the aircraft, that is in communication with the content loading panel via a physical connection. The content server may receive, via the physical connection, the in-flight entertainment content loaded via the content loading panel. The content server may store the received in-flight entertainment content. The content server may provision at least a portion of the stored in-flight entertainment content to a plurality of wireless access points located in the aircraft.

In some embodiments, the content server is located in an electronics or engineering bay of the aircraft. The content server may be located in a space that allows air cooling of the content server. The plurality of types of portable content storage devices may include one or more of: a secure digital (SD) device, a solid state drive (SSD) device, a universal serial bus (USB) device, a device coupled to an Ethernet connector, or a WiFi-enabled device. The content loading panel may be installed in a cabin overhead bin structure, a bulkhead structure, or a video control center (VCC) of the aircraft.

In certain embodiments, the content loading panel provides an interface for at least one of: initiating maintenance built-in-test (MBIT) or displaying MBIT status. The content loading panel may provide an interface for cabin crew to control a wireless network of the cabin. The content server may be configured with power-over-Ethernet ports to power one or more of the plurality of wireless access points. Each of the plurality of wireless access points may distribute the in-flight entertainment content from the content server to one or more user devices via WiFi-connectivity. In some embodiments, the content server hosts application software for providing in-flight entertainment functionality and services to a user in the aircraft. The content server may provide power to the content loading panel. The content server may receive the in-flight entertainment content from the content loading panel via a peripheral connection interconnect express (PCIe) link over fiber optic cabling. The content server may store the received in-flight entertainment content in one or more solid state drive (SSD) devices for provisioning to one or more of the plurality of wireless access points. The content server may include a connection to a satellite communication antenna coupled to the aircraft for satellite communication (e.g., with one or more ground stations).

In a further aspect, embodiments of the inventive concepts disclosed herein are directed to method for transferring in-flight entertainment content. The method may include loading, by a content loading panel at a first location within an aircraft, in-flight entertainment content from at least one of a plurality of types of portable content storage devices. A content server, at a second location within the aircraft, may receive, via a physical connection with the content loading panel, the in-flight entertainment content loaded via the content loading panel. The content server may store the received in-flight entertainment content. The content server may provision at least a portion of the stored in-flight entertainment content to a plurality of wireless access points located in the aircraft.

In some embodiments, the content server provides power to the plurality of wireless access points via power-over-Ethernet ports. The content server may provide power to the content loading panel. The content server may be located in a space that allows air cooling of the content server. In certain embodiments, the plurality of types of portable content storage devices comprises one or more of: a secure digital (SD) device, a solid state drive (SSD) device, a universal serial bus (USB) device, a device coupled to an Ethernet connector, or a WiFi-enabled device. The content loading panel may be installed in a cabin overhead bin structure, a bulkhead structure, or a video control center (VCC) of the aircraft.

BRIEF DESCRIPTION OF THE DRAWINGS

Various objects, aspects, features, and advantages of the inventive concepts disclosed herein will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

The details of various embodiments of the methods and systems are set forth in the accompanying drawings and the description below.

DETAILED DESCRIPTION

For purposes of reading the description of the various embodiments of the inventive concepts disclosed herein, the following descriptions of the sections of the specification and their respective contents can be helpful:

Section A describes a network environment and computing environment which can be useful for practicing embodiments described herein; and Section B describes embodiments of systems and methods for transferring in-flight entertainment content.

A. Computing and Network Environment

Figure 1A:
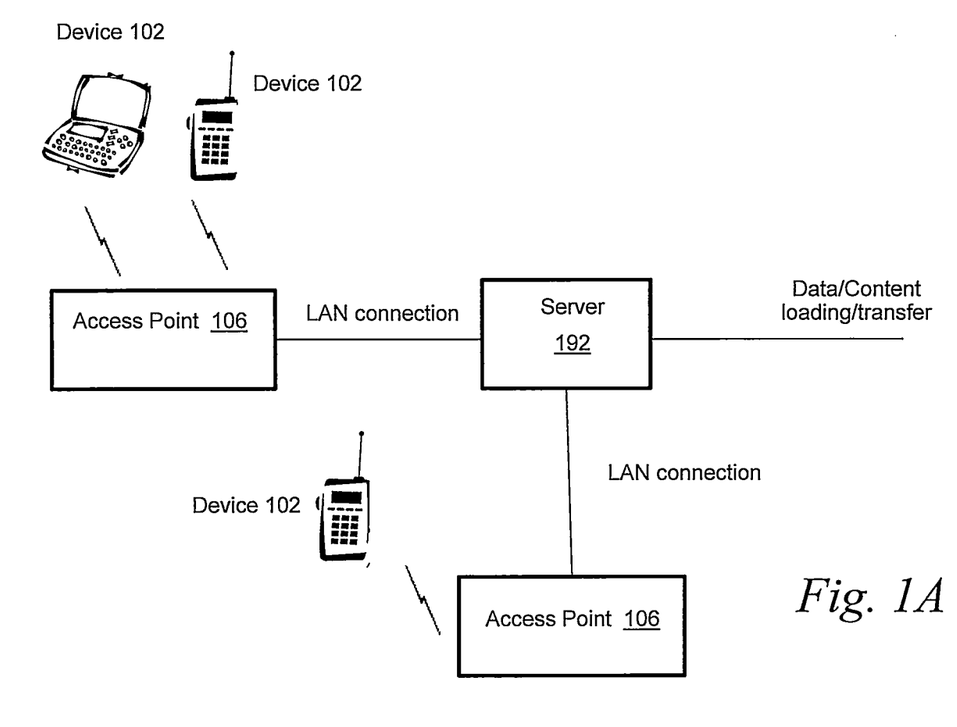
FIG. 1A is a block diagram depicting an embodiment of a network environment including one or more wireless communication devices in communication with one or more access points.

Prior to discussing specific embodiments of the inventive concepts disclosed herein, it might be helpful to describe aspects of the operating environment as well as associated system components (e.g., hardware elements) in connection with the methods and systems described herein. Referring to FIG. 1A, an embodiment of a network environment is depicted. In brief overview, the network environment may include wired and/or wireless portions. For instance, the network environment includes one or more access points 106, one or more wireless communication devices 102, and a server 192. The wireless communication devices 102 can, for example, include laptop computers 102, tablets 102, personal computers 102 and/or cellular telephone devices 102. The details of an embodiment of each wireless communication device, server and/or access point 106 are described in greater detail with reference to FIGS. 1B and 1C.

Terms such as "wireless communication device", "user equipment," "mobile station," "mobile," "mobile device," "access terminal," "terminal," "handset," and similar terminology, can refer to a wireless device utilized by a user (e.g., cabin passenger) of a wireless (in-flight) communication service to receive or convey data, control messages, voice, video, sound, gaming data, or substantially any data-stream or signaling-stream. The foregoing terms can be utilized interchangeably in the present disclosure. The access point (AP) may refer to a wireless network component or apparatus that serves and receives data, control messages, voice, video, sound, gaming data, or substantially any data-stream or signaling-stream from/to a set of wireless devices and/or a server.

Referring again to FIG. 1A, the access point 106 can be operably coupled to the server 192 via local area network connections, such as via gigabit Ethernet (GbE) connections. The server 192, which can include a router, gateway, switch, bridge, modem, system controller, appliance, etc., can provide a local area network connection for the communication system. Each of the access point 106 can have an associated antenna or an antenna array to communicate with the wireless communication devices 102 in its area. The wireless communication devices 102 can register with a particular access point 106 to receive services from the communication system (e.g., via a SU-MIMO or MU-MIMO configuration). Some of the wireless communication devices 102 can communicate directly via an allocated channel and communications protocol. Some of the wireless communication devices 102 can be mobile or relatively static with respect to the access point 106.

In some embodiments, an access point 106 includes a device or module (including a combination of hardware and software) that allows wireless communication devices 102 to connect to a network using Wi-Fi, and/or other standards. An access point 106 can be implemented, designed and/or built for operating in a wireless local area network (WLAN). The access point 106 can provide multiple devices 102 access to the server 192 or network. The server 192 can, for example, connect via wired Ethernet connections with the access points 106. An access point 106 can be built and/or implemented to support a standard for sending and receiving data using one or more radio frequencies. Those standards, and the frequencies they use, may be defined by the IEEE for example. An access point 106 can be implemented and/or used to support public Internet hotspots, and/or on an internal network to extend the network's signal (e.g., Wi-Fi) range.

In some embodiments, the access points 106 can be used for (e.g., in-cabin) wireless networks (e.g., IEEE 802.11, Bluetooth, ZigBee, any other type of radio frequency based network protocol and/or variations thereof). Each of the wireless communication devices 102 can include a built-in radio and/or is coupled to a radio. Such wireless communication devices 102 and/or access points 106 can operate in accordance with the various aspects of the disclosure as presented herein to enhance performance, reduce costs and/or size, and/or enhance broadband applications. Each wireless communication devices 102 can have the capacity to function as a client node seeking access to resources (e.g., data, content and connection to networked nodes such as servers) via one or more access points 106.

The network connections can include any type and/or form of network and can include any of the following: a point-to-point network, a broadcast network, a telecommunications network, a data communication network, a computer network. The topology of the network can be a bus, star, or ring network topology. The network can be of any such network topology as known to those ordinarily skilled in the art capable of supporting the operations described herein. In some embodiments, different types of data can be transmitted via different protocols. In other embodiments, the same types of data can be transmitted via different protocols.

Figure 1B:
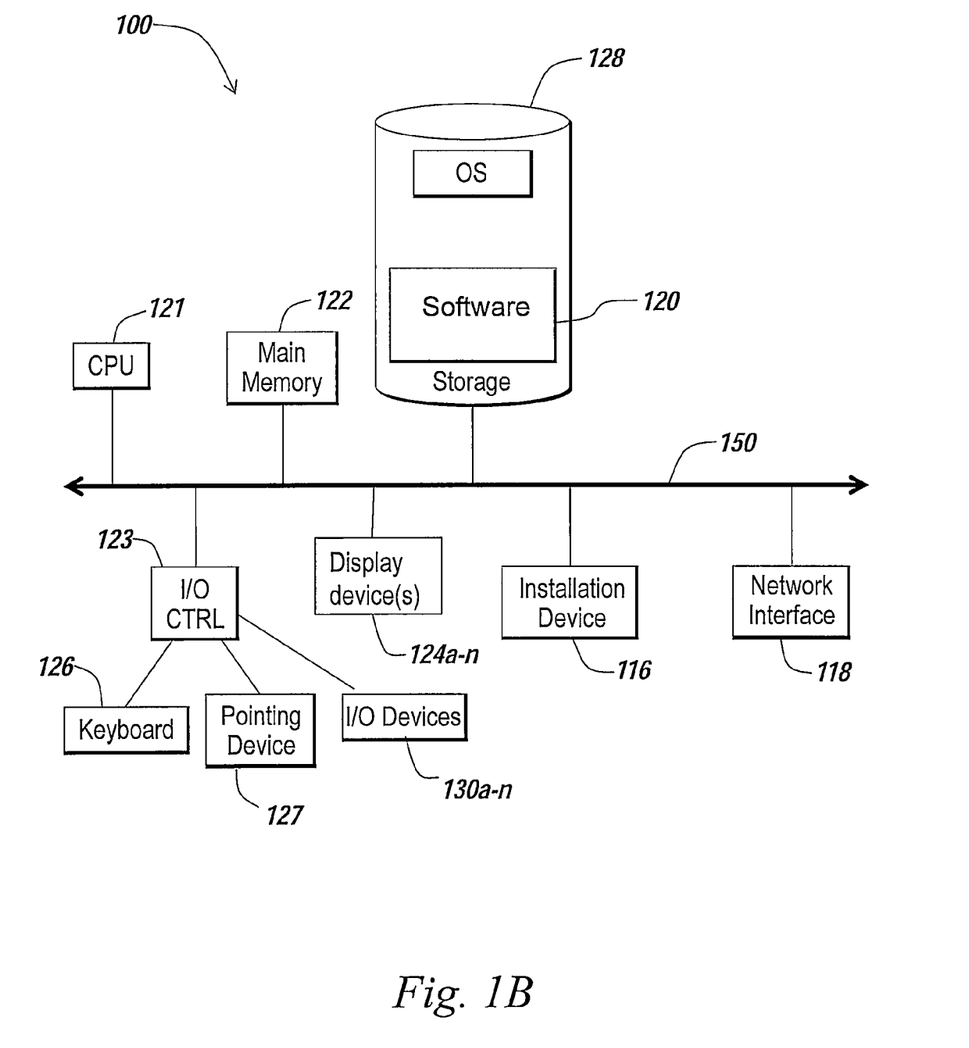
FIGS. 1B and 1C are block diagrams depicting embodiments of computing devices useful in connection with the methods and systems described herein.
Figure 1C:
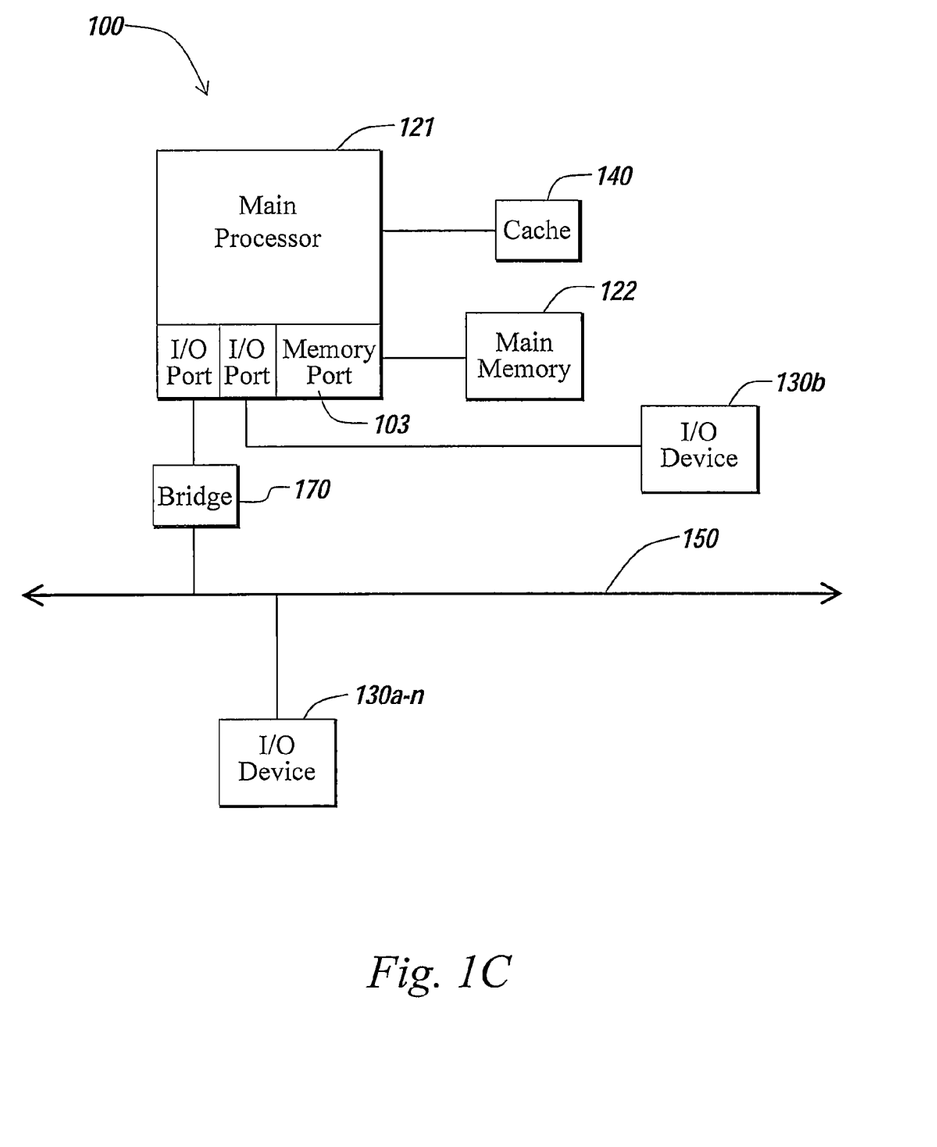

The communications device(s) 102, access point(s) 106 and/or server 192 can be deployed as and/or executed on any type and form of computing device, such as a computer, network device or appliance capable of communicating on any type and form of network and performing the operations described herein. FIGS. 1B and 1C depict block diagrams of a computing device 100 useful for practicing an embodiment of the wireless communication devices 102 or the base station 106. As shown in FIGS. 1B and 1C, each computing device 100 includes a processor 121, and a main memory unit 122. As shown in FIG. 1B, a computing device 100 can include a storage device 128, an installation device 116, a network interface 118, an I/O controller 123, display devices 124a-124n, and/or a keyboard 126 and a pointing device 127, such as a mouse. The storage device 128 can include, without limitation, an operating system and/or software. As shown in FIG. 1C, each computing device 100 can also include additional optional elements, such as a memory port 103, a bridge 170, one or more input/output devices 130a-130n (generally referred to using reference numeral 130), and a cache memory 140 in communication with the central processing unit 121.

The processor 121 may include any logic circuitry that responds to and processes instructions fetched from the main memory unit 122. The processor 121 may sometimes be referred to as a microprocessor or central processing unit. The processor 121 may include, for example, a single or multi-core processor, digital signal processor, field programmable gate array (FPGA) device, application specific integrated circuit (ASIC), or combinations thereof. The computing device 100 can be based on one of more of these processors, or any other processor capable of operating as described herein.

Main memory unit 122 can be one or more memory chips capable of storing data and allowing any storage location to be directly accessed by the processor 121, such as any type or variant of Static random access memory (SRAM), Dynamic random access memory (DRAM), Ferroelectric RAM (FRAM), NAND Flash, NOR Flash and Solid State Drives (SSD). The main memory 122 can be based on any of the above described memory chips, or any other available memory chips capable of operating as described herein. In the embodiment shown in FIG. 1B, the processor 121 communicates with main memory 122 via a system bus 150 (described in more detail below). FIG. 1C depicts an embodiment of a computing device 100 in which the processor 121 communicates directly with main memory 122 via a memory port 103. For example, in FIG. 1C the main memory 122 can be DRDRAM.

FIG. 1C depicts an embodiment in which the processor 121 communicates directly with cache memory 140 via a secondary bus, sometimes referred to as a backside bus. In some embodiments, the processor 121 communicates with cache memory 140 using the system bus 150. Cache memory 140 typically has a faster response time than main memory 122 and is provided by, for example, SRAM, BSRAM, or EDRAM. In the embodiment shown in FIG. 1C, the processor 121 communicates with various I/O devices 130 via a local system bus 150. Various buses can be used to connect the processor 121 to any of the I/O devices 130, for example, a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 124, the processor 121 can use an Advanced Graphics Port (AGP) to communicate with the display 124. FIG. 1C depicts an embodiment of a computer 100 in which the processor 121 can communicate directly with an I/O device 130b, for example via HYPERTRANSPORT, RAPIDIO, or INFINIBAND communications technology. FIG. 1C also depicts an embodiment in which local busses and direct communication are mixed: the processor 121 communicates with I/O device 130a using a local interconnect bus while communicating with I/O device 130b directly.

A wide variety of I/O devices 130a-130n can be present in the computing device 100. Input devices include keyboards, mice, trackpads, trackballs, microphones, dials, touch pads, touch screen, and drawing tablets. Output devices include video displays, speakers, inkjet printers, laser printers, projectors and dye-sublimation printers. The I/O devices can be controlled by an I/O controller 123 as shown in FIG. 1B. The I/O controller can control one or more I/O devices such as a keyboard 126 and a pointing device 127, e.g., a mouse or optical pen. Further, an I/O device can also provide storage and/or an installation medium 116 for the computing device 100. In still other embodiments, the computing device 100 can provide USB connections (not shown) to receive handheld USB storage devices such as the USB Flash Drive line of devices manufactured by Twintech Industry, Inc. of Los Alamitos, Calif.

Referring again to FIG. 1B, the computing device 100 can support any suitable installation device 116, such as a disk drive, a CD-ROM drive, a CD-R/RW drive, a DVD-ROM drive, a flash memory drive, secure digital (SD) device, tape drives of various formats, USB device, hard-drive, a network interface, or any other device suitable for installing software and programs. The computing device 100 can further include a storage device, such as one or more hard disk drives or redundant arrays of independent disks, for storing an operating system and other related software, and for storing application software programs such as any program or software 120 for implementing (e.g., built and/or designed for) the systems and methods described herein. Optionally, any of the installation devices 116 could also be used as the storage device. Additionally, the operating system and the software can be run from a bootable medium.

Furthermore, the computing device 100 can include a network interface 118 to interface to the network 104 through a variety of connections including, but not limited to, standard telephone lines, LAN or WAN links (e.g., 802.11, satellite), broadband connections (e.g., Frame Relay, Gigabit Ethernet), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, IEEE 802.11n, IEEE 802.11ac, IEEE 802.11ad, WiMax and direct asynchronous connections). In one embodiment, the computing device 100 communicates with other computing devices 100' via any type and/or form of gateway or tunneling protocol such as Secure Socket Layer (SSL) or Transport Layer Security (TLS). The network interface 118 can include a built-in network adapter, network interface card, peripheral connection interconnect express (PCIe) adaptor, PCMCIA network card, card bus network adapter, wireless network adapter, USB network adapter, modem or any other device suitable for interfacing the computing device 100 to any type of network or device capable of communication and performing the operations described herein.

In some embodiments, the computing device 100 can include or be connected to one or more display devices 124a-124n. As such, any of the I/O devices 130a-130n and/or the I/O controller 123 can include any type and/or form of suitable hardware, software, or combination of hardware and software to support, enable or provide for the connection and use of the display device(s) 124a-124n by the computing device 100. For example, the computing device 100 can include any type and/or form of video adapter, video card, driver, and/or library to interface, communicate, connect or otherwise use a display device 124.

In further embodiments, an I/O device 130 can be a bridge between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a Fibre-Channel bus, a Serial Attached small computer system interface bus, a USB connection, or a HDMI bus.

A computing device 100 of the sort depicted in FIGS. 1B and 1C can operate under the control of an operating system, which control scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: Android, produced by Google Inc.; WINDOWS 7, 8 and 10, produced by Microsoft Corporation of Redmond, Wash.; MAC OS, produced by Apple Computer of Cupertino, Calif.; and Linux, a freely-available operating system distributed by Caldera Corp. of Salt Lake City, Utah, or any type and/or form of a Unix operating system, among others.

The computer system 100 can be any workstation, telephone, desktop computer, laptop or notebook computer, server, handheld computer, mobile telephone or other portable telecommunications device, media playing device, media storing device, media loading device, a gaming system, mobile computing device, or any other type and/or form of computing, telecommunications or media device that is capable of communication. The computer system 100 has sufficient processor power and memory capacity to perform the operations described herein.

In some embodiments, the computing device 100 can have different processors, operating systems, and input devices consistent with the device. For example, in one embodiment, the computing device 100 is a smart phone, mobile device, tablet or personal digital assistant. In still other embodiments, the computing device 100 is an Android-based mobile device, an iPhone smart phone manufactured by Apple Computer of Cupertino, Calif. Moreover, the computing device 100 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

Aspects of the operating environments and components described above will become apparent in the context of the systems and methods disclosed herein.

B. Transfer of In-Flight Entertainment Content

Before describing in detail the present systems and methods, it should be observed that the inventive concepts disclosed herein includes, but are not limited to, a novel structural combination of data processing components and communications circuits, and not in the particular detailed configurations thereof. Accordingly, the structure, methods, functions, control and arrangement of components, software, and circuits have, for the most part, been illustrated in the drawings by readily understandable block representations and schematic diagrams, in order not to obscure the disclosure with structural details which will be readily apparent to those skilled in the art, having the benefit of the description herein. Further, the inventive concepts are not limited to the particular embodiments depicted in the exemplary diagrams, but should be construed in accordance with the language in the claims.

In some aspects, the inventive concepts disclosed herein are directed to systems and methods for transferring in-flight entertainment (IFE) content. The present systems and methods may implement or incorporate the use of an IFE system which includes a content loading component and a content server. The content loading component and the content server may be communicatively arranged and located at different areas within an aircraft. The content loading component is sometimes referred to as a cabin control panel (CCP) or content loading panel. The content server is sometimes referred to as a FFP-2. The IFE system provides a flexible platform to deliver services to wireless passenger mobile devices. The services being delivered can include those for audio/video on demand (AVOD), moving map display, games, advertising or other augmented content, pay per view, Internet and/or local intranet content, shopping (e.g., duty free shopping), credit card or other types of payment, e-reader or other electronic literary content (e.g., magazines), and/or airline defined custom applications.

Figure 2A:
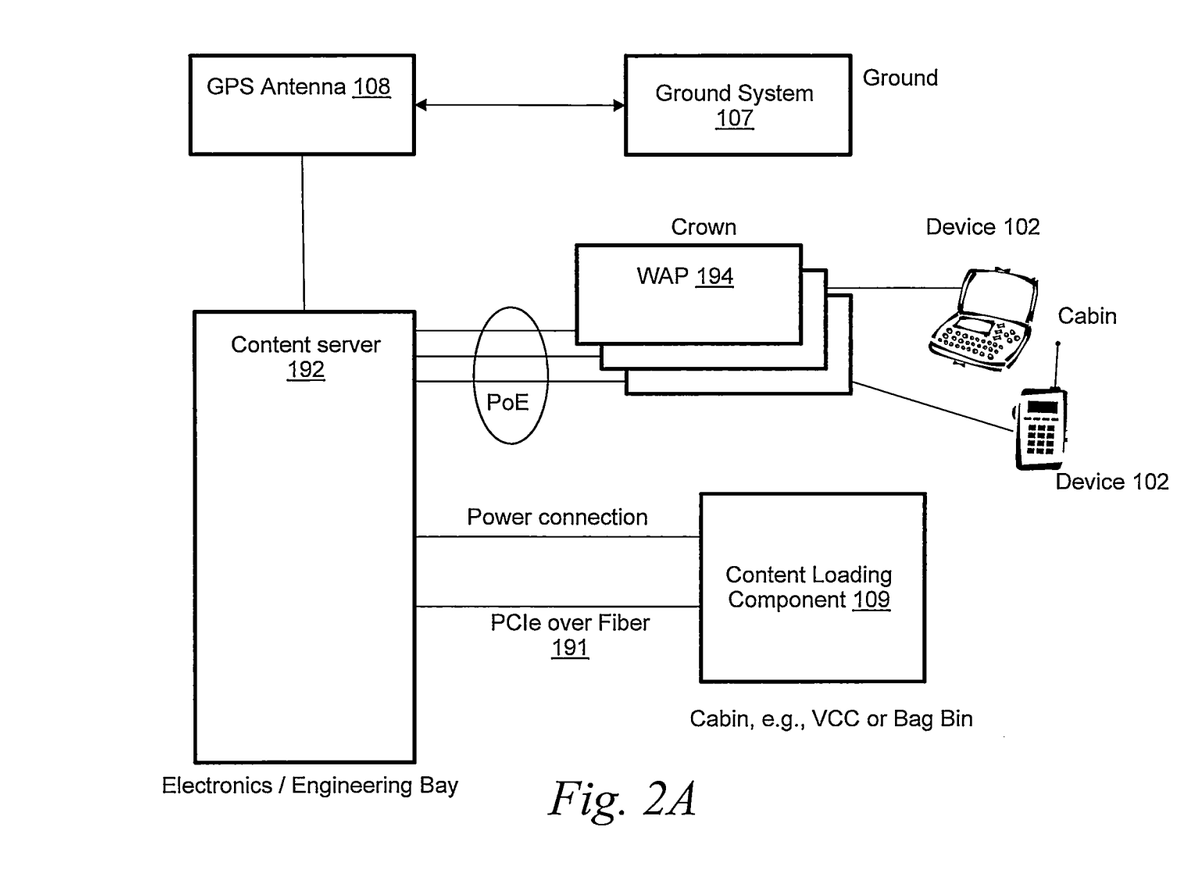
FIG. 2A is a block diagram depicting one embodiment of a system for transferring in-flight entertainment content.

Referring to FIG. 2A, one example embodiment of a system for IFE content loading and/or transfer is depicted. The system (sometimes referred to as an IFE system) includes a content loading panel or component 109, a content server 192, one or more wireless access points (WAPs) 194, and one or more devices 102 (e.g., user devices and/or entertainment units) located on or within an aircraft. In some embodiments, the system includes an antenna 108, installed on the aircraft, for Iridium satellite communication. This enables the system or platform to establish a communication pipe with a ground system 107. The same antenna 108 can be used for global positioning system (GPS), e.g., simultaneously for communications with the ground system 107. Each of the above-mentioned elements or entities is implemented in hardware, or a combination of hardware and software, in one or more embodiments. For instance, each of these elements or entities could include any application, program, library, script, task, service, process or any type and form of executable instructions executing on hardware of the system, in one or more embodiments. The hardware includes circuitry such as one or more processors, for example, as described above in connection with FIGS. 1B and 1C, in some embodiments.

In some embodiments, the IFE system is designed and/or implemented to enable loading or transfer of IFE content between the content loading component 109 and the content server 192. Content is initially loaded to the content loading component 109 from a content source or storage/transfer device that is not permanently coupled to the IFE system. The content loading component 109 then allows loading and transferring of the content to the content server 192, for storage and streaming to one or more wireless access points (WAPs) 194 distributed within an aircraft. The content server 194 can include or operate as a high speed media server.

Figure 2B:
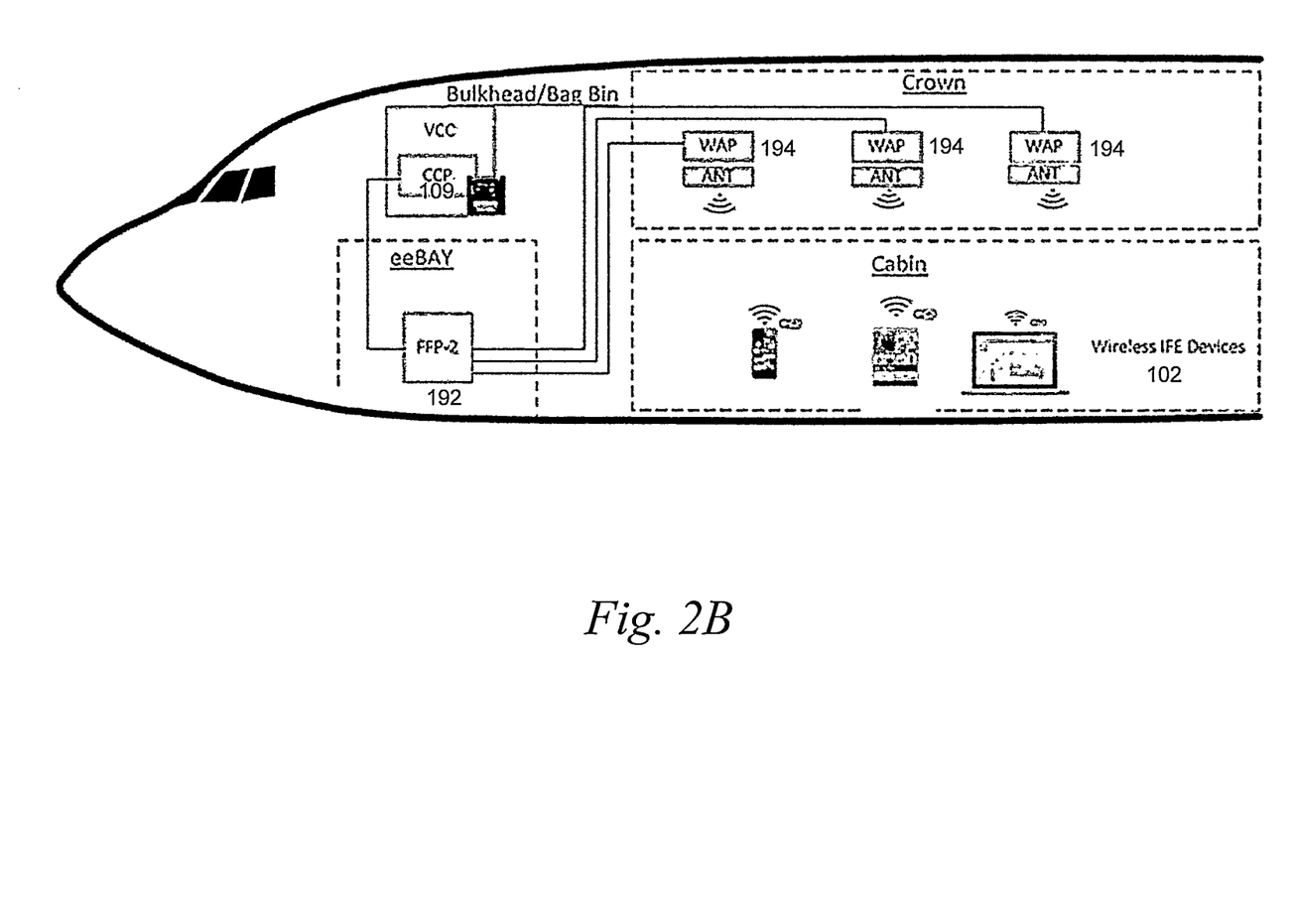
FIG. 2B is a diagram depicting one embodiment of a system for transferring in-flight entertainment content.

FIG. 2B depicts another embodiment of a system for IFE content loading and/or transfer. Various components of the system may be located or installed at specific locations of the aircraft for particular reasons. For instance, the content server 194 may be located at a first location within an aircraft, such as in an electronics/engineering (E/E) bay area, which allows for air cooling of the high speed media server. The content loading component 109 can be a compact interface or module that resides in a second location of the aircraft, such as a location in the cabin, bulkhead or bag bin region, for accessibility for example. One or more devices 102 may be located within the cabin and/or other passenger traffic areas for instance. One or more WAPs 194 may be spatially disposed and/or distributed across a crown or top portion of the aircraft proximate to cabin locations for example, where the one or more devices 102 may reside. The one or more WAPs 194 can alternatively or additionally be located at or near side portions and/or bottom portions of the aircraft.

Content may include assets such as video files, audio files, graphic files, portions thereof, or combinations thereof, in some embodiments. Although portions of this disclosure may refer to the transfer and/or loading of content or IFE content, these can include any IFE or passenger services related content and/or information, such as videos related to aircraft safety and features, and shopping catalogs. Content, such as video content, audio content, menus, schedules, graphics and/or other electronic content may be delivered from the content loading component 109 and/or content server 192 to a user device or entertainment unit 102 for use or consumption (e.g., viewing and/or listening) by a user. For example, an IFE or passenger entertainment system can provide a variety of content including but not limited to web pages, entertainment guides, video-on-demand, audio-on-demand, near video-on-demand, and digital audio and video broadcasts to a passenger in an aircraft. The IFE system provide content on-demand, such as movies with or without digital rights management (DRM), television shows, music, and electronic books or magazines. The IFE system can provide avionics information services such as moving map updates, via HTML or otherwise, with support on various user device operating systems (e.g., iOS, Android). The IFE system can support e-commerce services such as catalog shopping, payment services (e.g., non-real time services, or real time services if connected), or pay per view. The IFE system can support advertising or other augmented content (e.g., in connection with delivery of IFE content), which may include one or more of: static images (e.g., in GIF) and advertising videos within movies. Such advertising or other augmented content may be updated via the content loading component 109 for example.

The IFE or passenger entertainment system can deliver content via wired and/or wireless communication network (s) to one or more entertainment units disposed for instance in the back portion of the passenger seats, and/or to one or more user devices such as a tablet. In some embodiments, the IFE system can deliver content wirelessly from the content server 192 via one or more access points 194 to a user device 102. According to some embodiments, the content server 192 provides content to be stored, buffered and/or consumed at one or more entertainment units and/or user devices 102.

Each entertainment unit or user device, 102 sometimes referred to as a target unit 102, can include a user interface or application, a video screen, a speaker and/or headphone jack, and/or a processing unit. For instance, a user device may include an installed application to access IFE content, such as the "Rockwell Collins Airshow® for iPad" application by way of a non-limiting example. A passenger can select content for viewing or listening via the user interface or application. The processing unit can provide the content to the video screen, speaker, and/or head phone jack. The content is provided from a head end of the network associated with IFE, the head end comprising the content server. In some systems, loading and/or distributing content throughout the network can require a significant amount of time, especially when large amounts of content are being transferred and made available for consumption by users. Further, ensuring that each user has access to the appropriate or requested content, and that all of the associated content is available to the user, can require significant time and/or bandwidth for transfer in conventional systems.

Prior to making content available to a user or passenger on the aircraft, the content is loaded to the IFE system from a content source or storage/transfer device that is not permanently coupled to the IFE system. As an initial step for example, the content is loaded or transferred to the content loading component 109 of the IFE system. The content loading component 109 may comprise a high speed loader and a control panel. The content loading component 109 can include a communications processing board designed to speed up the loading of media content (e.g., 512 GB in minutes) from one or more content sources and/or storage devices to an IFE system, using various interfaces, connectors, devices, and/or communications protocols for transfer. For instance, the content loading component 109 can support an Ethernet loader, SD cards, SSD and/or USB, for content loading. The content loading component 109 may offer multiple data loading solutions, e.g., USB, Ethernet (e.g., via 1×1000BASE-T 1 Gigabit Ethernet ports), SD cards (e.g., SD, SDHC, SDXC), Wifi/3G/4G to perform media content upload and database update capability. The content loading component 109 can provide high speed loading and/or background content loading, for example from any content source or storage device to the content loading component 109, and/or from the content loading component 109 to the content server 109. The content loading component 109 can support parallel content loading via multiple interfaces and/or from multiple devices. For example, content stored on multiple SD cards can be loaded in parallel to content loading component 109. As another example, content may be loaded in parallel via an Ethernet interface and an USB interface.

A WiFi option or capability of the content loading component 109 can allow connection to an airport network as a WiFi client or can be used as a low cost wireless access point. The content loading component can be installed in the video control center (VCC), for example on an A330 aircraft, or an IFE control panel or overhead bin, for example on an A320/A321 aircraft, or other locations of an aircraft.

Figure 2C:
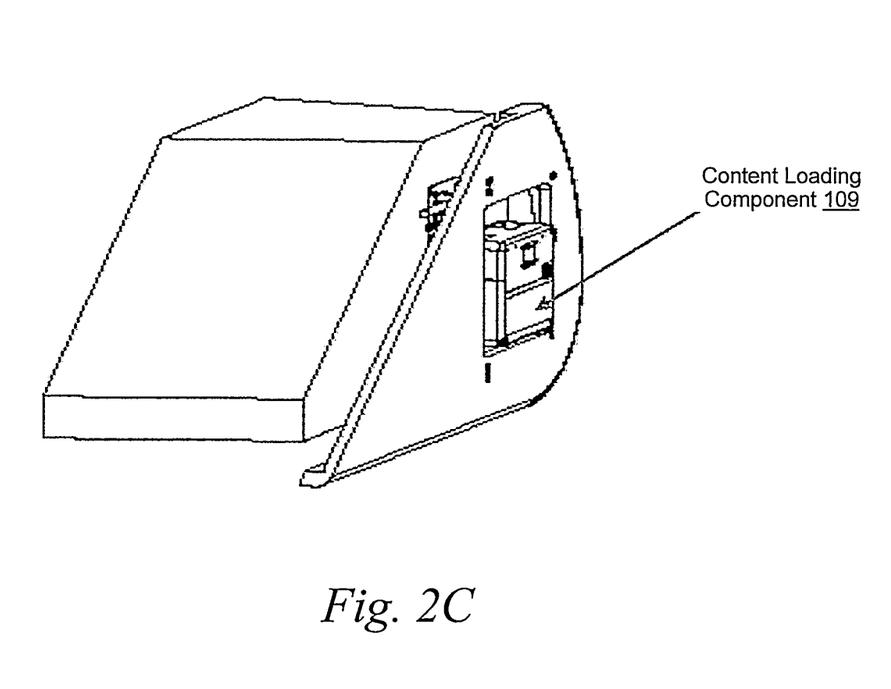
FIG. 2C is a diagram depicting one embodiment of a content loading component of a system for transferring in-flight entertainment content.

FIG. 2C shows one embodiment of a content loading component 109 of an IFE system, installed in an overhead bin area of an aircraft. In certain embodiments, the content loading component 109 allows cabin crew to control the cabin's wireless network for the activation/de-activation of WiFi connectivity. The content loading component 109 can provide an interface to initiate maintenance built-in-test (MBIT) and/or display built-in-test status.

Figure 2D:
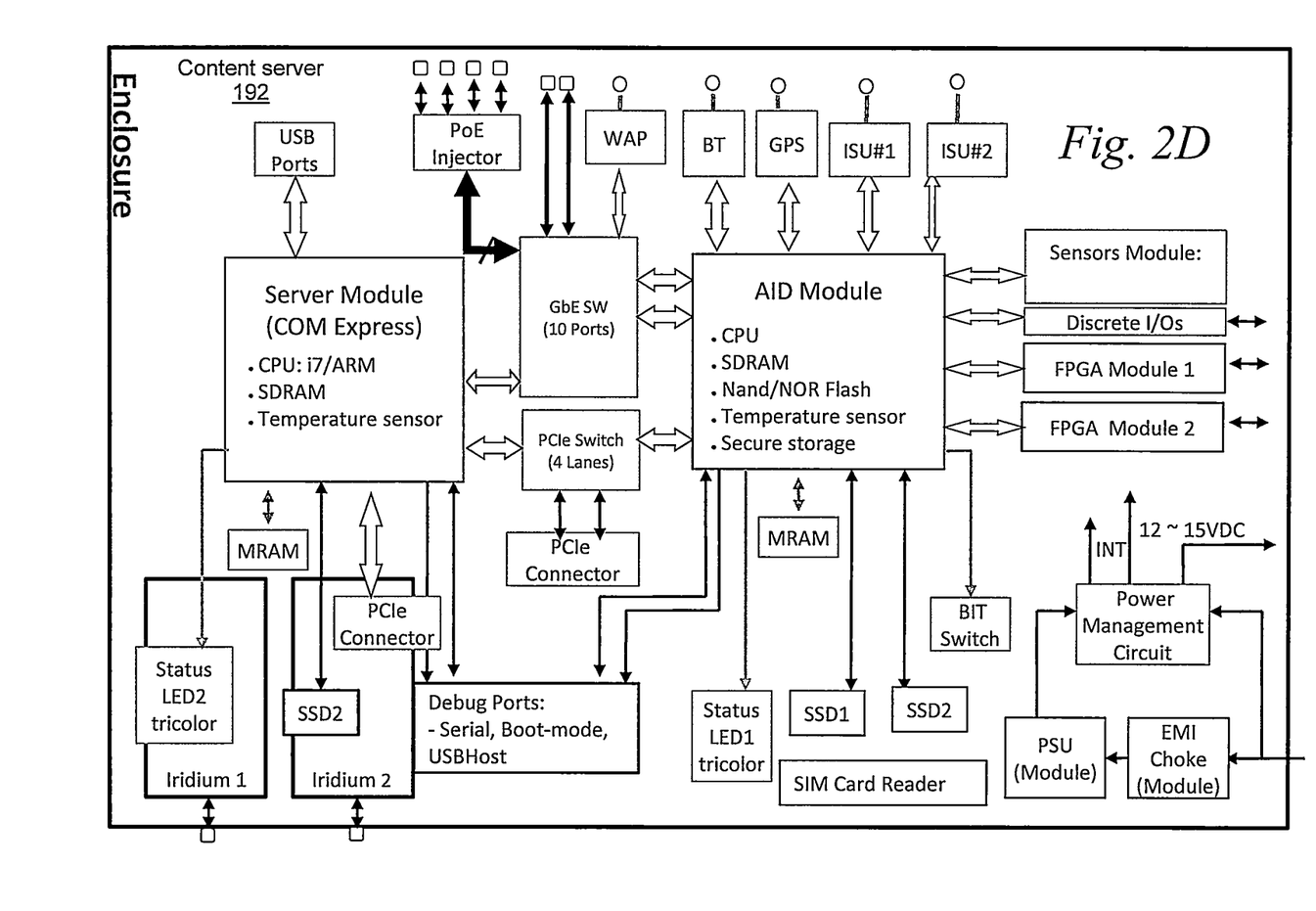
FIG. 2D is a block diagram depicting one embodiment of a content server of a system for transferring in-flight entertainment content.

By way of illustration, one embodiment of the content loading component 109 may include one or more of the following interfaces:
- 1×P/B System ON/OFF (provision only)
- 1×P/B Cabin Wifi ON/OFF
- 1×P/B MBIT request
- 1×LAN GbE for external ETH/Ethernet (RJ45)
- 2× USB3.0 ports & 2× USB port LEDs
- 6× SD card slots & 6× SD card slots LEDs
- 1×BIT in-progress LED
- 1×System health status LED
- 1×IFE application health status LED
- 1×WAP-On LED
- 1×SIM card slot
- 1×CCP Power ON/OFF status LED Referring to FIG. 2D, a block diagram of one embodiment of a content server of a system for IFE content loading and/or transfer is depicted. For example, the content server 192 may include a service module comprising a high-performance processor, random access memory and a temperature sensor for monitoring heat output and/or controlling cooling mechanism(s). The content server 192 may include one or more storage devices such as solid state drives, SSD1 and SSD2. By way of a non-limiting example, one embodiment of the content server 192 may include one or more of: an Intel i7 quad core processor, 8 GB DDR3 RAM, storage for 1.5 TB SSD (3×500 GB/512 GB), power over Ethernet (PoE) power injection, a multiport gigabit (GB) Ethernet switch, aircraft interfaces (e.g., ARINC 429 and discretes), and/or forced air cooling.

The content server 192 may provide power to the control loading component 109 in some embodiments. The content server 192 may include PoE interfaces/connections to the one or more WAPs 194 (e.g., support up to five PoE WAPs). The content server 192 may include an Ethernet controller with a Gigabit Ethernet managed L3 switch, for example with a total of ten external ports, and of these ports PoE enabled. In some embodiments, the content server 192 uses PoE with quad distribution. The content server 192 may support PoE corresponding to IEEE 802.3af for instance.

The content server 192 may include interfaces and/or modules for communications using Bluetooth (BT), gigabit Ethernet (GbE), USB and/or GPS channels. In some embodiments, the content server 192 includes a built-in GPS. By way of illustration, one embodiment of the content server 192 may include one or more of the following interfaces:
- Special Discrete Inputs (DSI): Weight-on-Wheel, Engine-OFF, System Power-On, Cabin "WAP On/Off" command from CCP, Cabin Wifi On/Off command from cockpit.
- Special Discrete Outputs (DSO): 1×DSO WAP Wifi enable, 1×DSO 3G/4G enable/inhibition (both signals can be connected to CCP)
- General Purpose DSI: 12×DSI OPN/GND (e.g. 1×DSI Passenger Address-ON)+4× DSI 28V/OPN
- General Purpose Discrete Outputs (DSO)
- LED CMD WAP-On
- ARINC717 RX Bi Polar/Harvard Bi-Phase
- ARINC717 TX Bi Polar/Harvard Bi-Phase (for factory testing only)
- ARINC429 RX channels
- ARINC429 TX channel
- RS422 RX/TX channels
- Audio input+1×Audio output channels
- Gb Power-over-Ethernet ports (IEEE 802.3af) to power up to 5 WAP
- Gb Ethernet LAN channels (from FFP-2 to Right TIU, Left TIU, CCP, Spare 1 with Audio voice modulation, Spare 2 and Spare 3)
- 28V DC Power input channel
- 12V DC output Power channels (2× power to L TIU & R TIU+1×power to CCP)
- RF channels (1×Iridium ISU 1/GPS signals & 1×Iridium ISU 2 signal)
- PCIe thru Optical Fiber link to CCP (Tx+Rx channels)
- CS 3G/4G or WiFi module Antenna output (as provision, if CCP is not connected)
- HS 3G/4G or WiFi module Antenna output (as provision, if CCP is not connected)

For instance, the 3G/4G and/or WiFi interfaces may be used (e.g., to connect with ground services, using a cellular or WiFi network for communicating data/content) to bypass use of the content loading component 109 (CCP). In certain embodiments, the content server 192 may receive signals from the aircraft or public announcement (PA) system, e.g., to interrupt, pause or stop the provision of IFE related content to a target unit 102.

In some embodiments, the content server 192 operates as a central repository for storing and providing content to one or more target units 102. The content server 192 may be configured for unicasting or multicasting content, and/or determining the content to provide to certain users. The content server 192, as a central repository, may include one or more storage devices that includes or maintains a database. The database may include or store unique asset identifications for each asset to be distributed within an aircraft network to one or more target units 102.

Figure 2E:
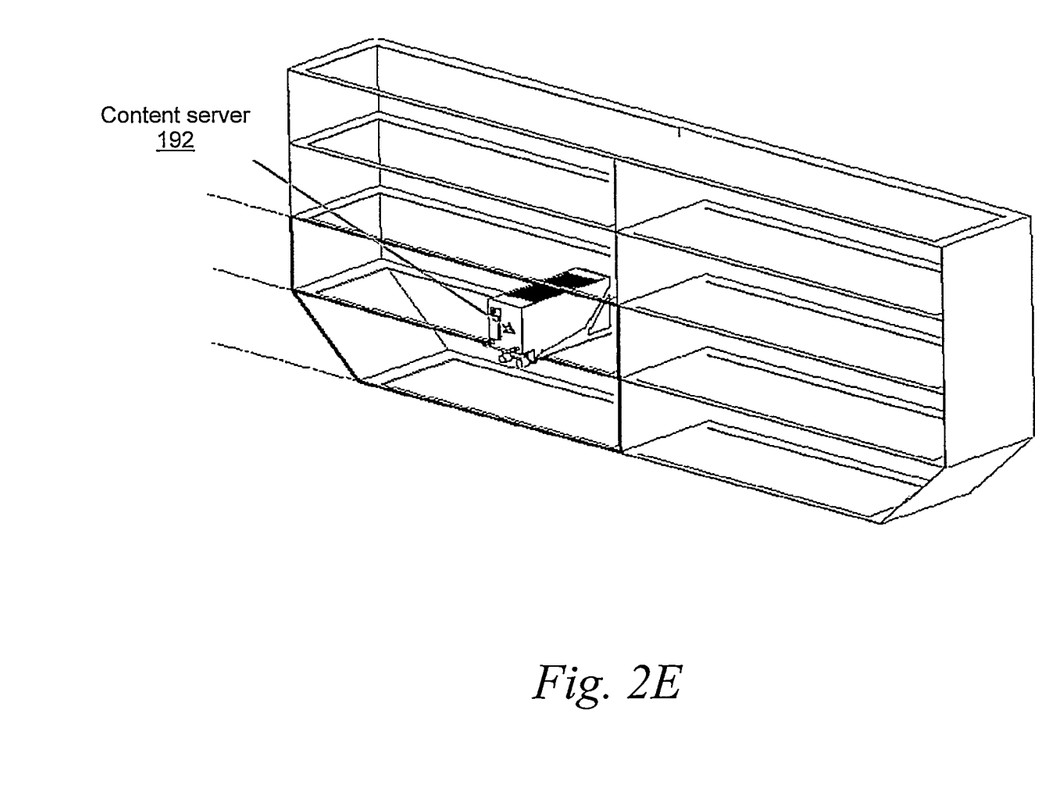
FIG. 2E depicts an example embodiment of a content server of a system for transferring in-flight entertainment content.

The content server 192 can function as an on-board server for hosting applications software to provide the IFE functionality and flight related services to an airline customer, such as satellite communication service, control of wireless (e.g., WiFi) cabin performance, synchronization, aircraft data-bus connectivity for reception of flight-data, and/or hosting and execution of EFB and/or IFE applications. The content server 192 can provide system related functionalities such as network security, built-in-test, software and/or database update. The content server 192 can be located in an avionics rack in an aircraft avionics bay, for example. FIG. 2E shows one embodiment of a content server 192 of an IFE system, installed or mounted on a rack, for instance in an engineering bay of an aircraft.

In some embodiments, the IFE system (e.g., via the content server 192) can provide full aircraft coverage of IFE related services for all passengers. The content server 192 can include appropriate storage capacity for IFE related content and data, e.g., 1.5 TB of content storage space, which can be scaled, partitioned and/or expanded. The content server 192 can provide reliable AVOD streaming, for example at a minimum of 1 megabits per second (Mbps). The content server 192 can provide an information system for passengers and/or crew, that for instance include aircraft location or moving map info and updates. The IFE system can provide support for operating systems of any user device, such as Android, iOS, Windows and MAC OS. The IFE system and/or content server 192 can be integrated with Aircraft Avionics (e.g., using ARINC 429, Keylines), to provide or enable automated enable/disable of radio frequency service, and pausing of content during public announcements (PA) transmissions. In some embodiments, the IFE system supports 2.4 and/or 5 GHz wireless operation, and 802.11n (a/b/g/n) wireless local network service. The IFE system can support or provide an open platform to allow integration of applications and/or features by third parties.

A number of wireless access points 194 can be installed on structure of an aircraft, for example above the cabin ceiling panel, to distribute content to portable devices 102 via a wireless Local Area Network (WLAN), and to provide full WiFi coverage throughout cabin area. WiFi-connectivity can allow passengers to access IFE media content for inflight streaming (e.g., movies, music, shopping information) from their laptop, tablet and other mobile devices, for instance. The WAPs 194 can each include a 1×1000BASE-T Gigabit Ethernet port with Power-over-Ethernet (PoE) support. One or more of WAPs 194 can be powered and controlled by the content server main board via Gigabit PoE. The WAPs may support IEEE 802.11 a/b/g/n, IEEE 802.11i (e.g., AES, WEP, WPA, WPA2), IEEE 802.11e, and/or WiFi multimedia (WMM). The WAPs 194 are MIMO capable to handle the harsh multi-path environment in an aircraft. Each WAP 194 may include a dual-radio, dual band, and three-stream 802.11n wireless access point designed for data, voice, and video applications in aircraft deployments. The WAPs 194 are capable of delivering wireless bandwidth to support every user on the aircraft.

Antennas of the WAPs radiate radio or WiFi signals in the aircraft cabin area, which can enable passengers to have WiFi connectivity for streaming of content using their laptop, smart phones and tablet, for example. Such antennas may be installed in the cabin ceiling panel attached to mounting brackets and the aircraft frame for example. The WAP Antenna may radiate radio signals of 3.5 dBi Gain at 2.4 Ghz and 4.0 dBi at 5.0 Ghz, for example. The WiFi signals emitted in the aircraft cabin area can enable passengers to have WiFi connectivity for streaming of movies, video and shopping using their laptop, smart phones and tablet for instance. In some embodiments, a WAP antenna is installed in the cabin ceiling panel attached to mounting bracket and aircraft Frame.

In some embodiments, the content loading component 109 and/or the content server 192 may be configured to allow automatic cabin WiFi activation. For instance, the cabin WiFi network may be switched on when the aircraft is airborne with altitude greater than a pre-defined threshold altitude (e.g. 10,000 ft above Mean Sea Level—MSL), and a WAP switch/setting is set to "ON", or when all engines of the aircraft are powered-off and the aircraft is on-ground and a WAP "ON/OFF" push button is switched-on. The cabin WiFi network may be switched off when the aircraft is airborne with altitude less than a pre-defined threshold altitude (e.g. 10,000 ft above MSL) and the WAP "ON/OFF" switch/setting is set to "off", or when at least one engine is powered-on and the aircraft is on the ground.

In some embodiments, the content loading component 109 and/or the content server 192 may be integrated with off aircraft connectivity, such as air-to-ground, satellite communications (Satcom), Gatelink and/or cellular connectivity. Such connectivity can for example, enable the content loading component 109 and/or the content server 192 provide one or more of: connected applications, passenger Internet, real time payment processing, content loading, system maintenance, or ground services.

The content server 192 may be operably coupled with a single or dual Iridium antenna on top of the aircraft fuselage for satellite communication via Iridium satellite network and/or other networks. A dual Iridium antenna 1×RF channel for Iridium ISU1/GPS signals+1×RF channel for Iridium ISU2 signal.

Figure 2F:
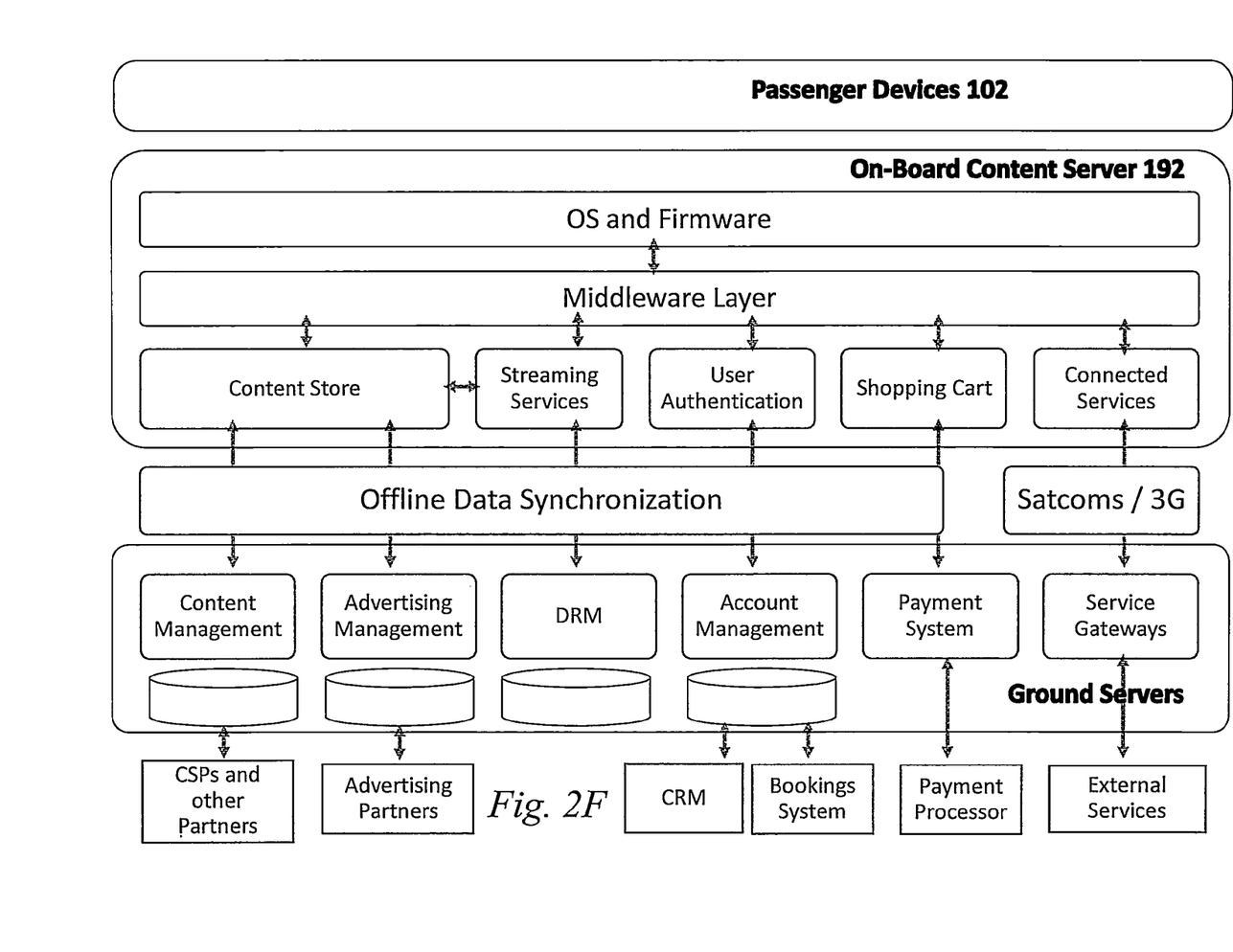
FIG. 2F depicts an example embodiment of a software architecture of an in-flight entertainment system.

Referring to FIG. 2F, a software architecture representation of one embodiment of an IFE system is depicted. The software architecture representation may include interfaces with passenger devices and/or ground services. For example, content server 192 software may include components for managing content storage, streaming services, user authentication, shopping cart operations and/or connected services, in providing passenger devices 102 with IFE related services. Content server 192 software components may interface with satellite and/or cellular communications counterparts from ground services.

Figure 2G:
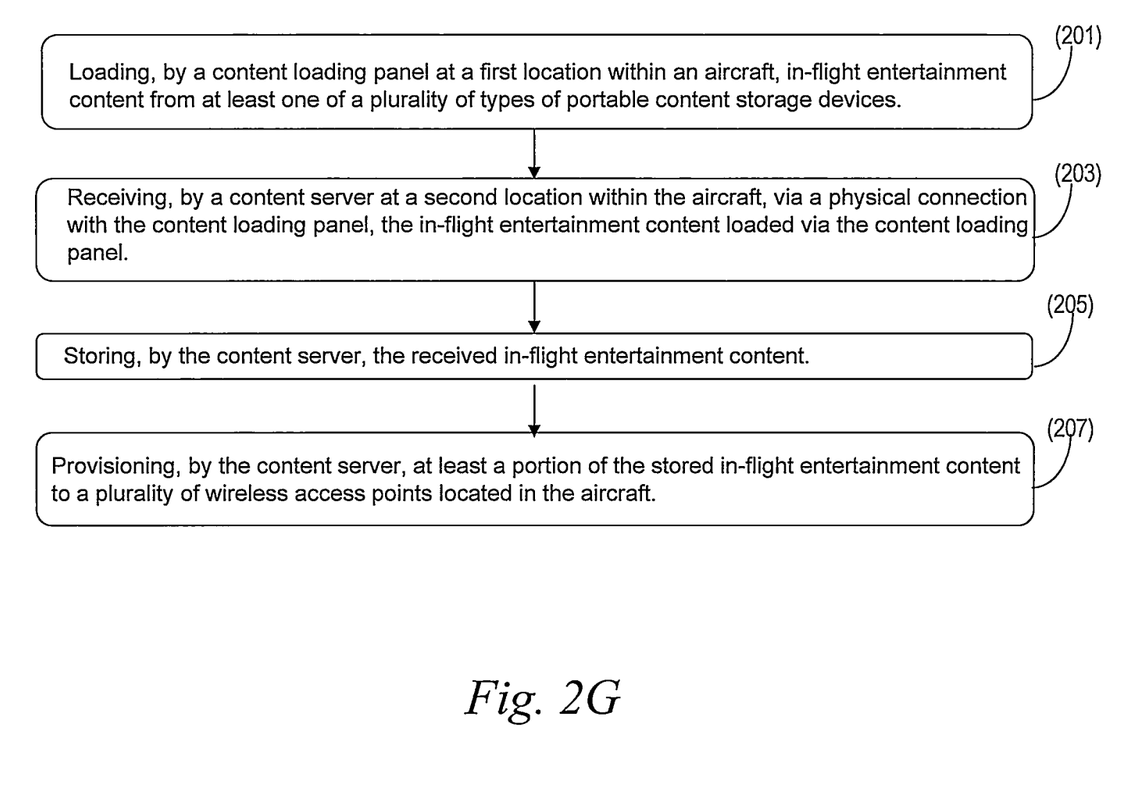
FIG. 2G is a flow diagram depicting one embodiment of a method for transferring in-flight entertainment content.

Referring now to FIG. 2G, one embodiment of a method for loading and/or transferring in-flight entertainment content is depicted. The method includes loading, by a content loading panel at a first location within an aircraft, in-flight entertainment content from at least one of a plurality of types of portable content storage devices (201). A content server, at a second location within the aircraft, may receive, via a physical connection with the content loading panel, the in-flight entertainment content loaded via the content loading panel (203). The content server may store the received in-flight entertainment content (205). The content server may provision at least a portion of the stored in-flight entertainment content to a plurality of wireless access points located in the aircraft (207).

Referring now to 201, and in some embodiments, a content loading panel, at a first location within an aircraft, loads in-flight entertainment content from at least one of a plurality of types of portable content storage devices. The content loading panel 109 may be located at or installed in an accessible and/or convenient location for transferring content from content sources and/or storage/transfer devices, such as within a cabin region or a non-E/E bay location. For example, the content loading panel 109 may be located at, or installed in a cabin overhead bin structure, a bulkhead structure, or a video control center (VCC) of the aircraft. The plurality of types of portable content storage devices may include one or more of: a secure digital (SD) device, a solid state drive (SSD) device, a universal serial bus (USB) device, a device coupled to an Ethernet connector, a 3G/4G device or a WiFi-enabled device.

The content loading panel 109 may load any type or form of content, including any IFE or passenger services related content and/or information, such as AVOD content (e.g., movies, TV shows), audio content, videos related to aircraft safety and features, menus, schedules, apps for installation on user devices, advertising and other augmented content, and shopping catalogs. The content loading component 109 can provide high speed loading and/or background content loading, for example from any content source or storage device to the content loading component 109, and/or from the content loading component 109 to a content server 109. The content loading component 109 can support parallel content loading via multiple interfaces and/or from multiple devices. For example, content stored on multiple SD cards can be loaded in parallel to content loading component 109, or content may be loaded in parallel via an Ethernet interface and an USB interface. A WiFi option or capability of the content loading component 109 can allow connection to an airport network for content loading to the IFE system.

Referring now to 203, and in some embodiments, a content server, at a second location within the aircraft, receives, via a physical connection with the content loading panel, the in-flight entertainment content loaded via the content loading panel. The content server 192 may be located in a space that allows air cooling of the content server 192, such as within an E/E bay of the aircraft. The content server 192 may be located at a second location of the aircraft different from the first location. The content server 192 may be located at a second location of the aircraft proximate to the first location, e.g., both located near the front of the aircraft. In some embodiments, the content server 192 provides power to one or more wireless access points 194 via power-over-Ethernet ports. The content server 192 may include PoE interfaces/connections to the one or more WAPs 194 (e.g., support up to five PoE WAPs). The content server 192 may include an Ethernet controller with a Gigabit Ethernet managed L3 switch, for example with a total of ten external ports, and of these ports PoE enabled. In some embodiments, the content server 192 uses PoE with quad distribution. The content server 192 may support PoE corresponding to IEEE 802.3af for instance. In certain embodiments, the content server 192 provides power to the content loading component 109.

Referring now to 205, and in some embodiments, the content server stores the received in-flight entertainment content. The content server 192 may include one or more storage devices such as solid state drives. The content server 192 can include appropriate storage capacity for IFE related content and data, e.g., 1.5 TB content storage, which can be scaled, partitioned and/or expanded. In some embodiments, the content server 192 operates as a central repository, and stores and provides content to one or more devices 102 in the aircraft. The content server 192 can host applications software to provide the IFE functionality and flight related services to an airline customer. The content server 192 can unicast or multicast content, and/or determine the content to provide to certain users or devices 102. The content server 192 may include one or more storage devices that includes or maintains a database. The database may include or store unique asset identifications for each asset (content) to be distributed within an aircraft network to one or more devices 102.

Referring now to 207, and in some embodiments, the content server provisions at least a portion of the stored in-flight entertainment content to a plurality of wireless access points located in the aircraft. Content, such as video content, audio content, menus, schedules, graphics and/or other electronic content may be delivered from the content server 192 to a device 102 for use or consumption (e.g., viewing and/or listening) by a user. For example, the content server 109 can provide a variety of content including but not limited to web pages, entertainment guides, video-on-demand, audio-on-demand, near video-on-demand, and digital audio and video broadcasts to a passenger in an aircraft. The content server 109 can provide content on-demand, such as movies with or without digital rights management (DRM), television shows, music, and electronic books or magazines. The content server 109 can provide avionics information services such as moving map updates, via HTML or otherwise, with support on various user device operating systems (e.g., iOS, Android). The content server 109 can provide e-commerce services such as catalog shopping, payment services (e.g., non-real time services, or real time services if connected), or pay per view. The content server 109 can provide advertising or other augmented content (e.g., in connection with delivery of IFE content), which may include one or more of: static images (e.g., in GIF) and advertising videos within movies. Such advertising or other augmented content may be updated via the content loading component 109 for example.

The content server 109 can deliver content via wired and/or wireless communication network(s) to one or more entertainment units 102 located for instance in the back portion of the passenger seats, and/or to one or more user devices 102 such as a laptop. In some embodiments, the IFE system can deliver content wirelessly from the content server 192 via one or more access points 194 to a device 102. According to some embodiments, the content server 192 provides content to be stored, buffered and/or consumed at one or more entertainment units and/or user devices 102.

It should be noted that certain passages of this disclosure can reference terms such as "first" and "second" in connection with devices, etc., for purposes of identifying or differentiating one from another or from others. These terms are not intended to merely relate entities temporally or according to a sequence, although in some cases, these entities can include such a relationship. Nor do these terms limit the number of possible entities (e.g., devices) that can operate within a system or environment.

It should be understood that the systems described above can provide multiple ones of any or each of those components and these components can be provided on either a standalone machine or, in some embodiments, on multiple machines in a distributed system. In addition, the systems and methods described above can be provided as one or more computer-readable programs or executable instructions embodied on or in one or more articles of manufacture. The article of manufacture can be a floppy disk, a hard disk, a CD-ROM, a flash memory card, a PROM, a RAM, a ROM, or a magnetic tape. In general, the computer-readable programs can be implemented in any programming language, such as LISP, PERL, C, C++, C#, PROLOG, or in any byte code language such as JAVA. The software programs or executable instructions can be stored on or in one or more articles of manufacture as object code.

While the foregoing written description of the methods and systems enables one of ordinary skill to make and use various embodiments of these methods and systems, those of ordinary skill will understand and appreciate the existence of variations, combinations, and equivalents of the specific embodiment, method, and examples herein. The present methods and systems should therefore not be limited by the above described embodiments, methods, and examples, but by all embodiments and methods within the scope and spirit of the disclosure.

We claim:

1. An avionics system for transferring in-flight entertainment content, the avionics system comprising:
   a content loading panel at a first location within an aircraft, the content loading panel configured to load in-flight entertainment content from at least one of a plurality of types of portable content storage devices; and
   a content server located away from the content loading panel at a second location within the aircraft that is different from the first location, the content server in communication with the content loading panel via a physical connection that extends between the first location and the second location, the content server configured to:
      receive, via the physical connection, the in-flight entertainment content loaded via the content loading panel;

store the received in-flight entertainment content; and communicate at least a portion of the stored in-flight entertainment content directly to each of a plurality of wireless access points located in the aircraft, by residing communicatively between the content loading panel and a plurality of wireless access points, each of the plurality of wireless access points configured to wirelessly transmit the at least a portion of in-flight entertainment content directly to a corresponding plurality of user devices for user consumption.

2. The avionics system of claim 1, wherein the content server is located in an electronics or engineering bay of the aircraft.

3. The avionics system of claim 1, wherein the content server is located in a space that allows air cooling of the content server.

4. The avionics system of claim 1, wherein the plurality of types of portable content storage devices comprises one or more of: a secure digital (SD) device, a solid state drive (SSD) device, a universal serial bus (USB) device, a device coupled to an Ethernet connector, or a WiFi-enabled device.

5. The avionics system of claim 1, wherein the content loading panel is installed in a cabin overhead bin structure, a bulkhead structure, or a video control center (VCC) of the aircraft.

6. The avionics system of claim 1, wherein the content loading panel is configured to provide an interface for at least one of: initiating maintenance built-in-test (MBIT) or displaying MBIT status.

7. The avionics system of claim 1, wherein the content loading panel is configured to provide an interface for cabin crew to control a wireless network of the cabin.

8. The avionics system of claim 1, wherein the content server is configured with power-over-ethernet ports to power one or more of the plurality of wireless access points.

9. The avionics system of claim 1, wherein each of the plurality of wireless access points is configured to distribute the in-flight entertainment content to the corresponding plurality of user devices via WiFi-connectivity.

10. The avionics system of claim 1, wherein the content server is configured to host application software for providing in-flight entertainment functionality and services to a user in the aircraft.

11. The avionics system of claim 1, wherein the content server is configured to provide power to the content loading panel.

12. The avionics system of claim 1, wherein the content server is configured to receive the in-flight entertainment content from the content loading panel via a peripheral connection interconnect express (PCIe) link over fiber optic cabling.

13. The avionics system of claim 1, wherein the content server is configured to store the received in-flight entertainment content in one or more solid state drive (SSD) devices for provisioning to one or more of the plurality of wireless access points.

14. The avionics system of claim 1, wherein the content server includes a connection to a satellite communication antenna coupled to the aircraft, for satellite communication to one or more ground station.

15. A method for transferring in-flight entertainment content, the method comprising:

loading, by a content loading panel at a first location within an aircraft, in-flight entertainment content from at least one of a plurality of types of portable content storage devices; and receiving, by a content server located away from the content loading panel at a second location within the aircraft that is different from the first location, via a physical connection with the content loading panel that extends between the first location and the second location, the in-flight entertainment content loaded via the content loading panel;

storing, by the content server, the received in-flight entertainment content; and communicating, by the content server, at least a portion of the stored in-flight entertainment content directly to each of a plurality of wireless access points located in the aircraft, by residing communicatively between the content loading panel and a plurality of wireless access points, each of the plurality of wireless access points configured to wirelessly transmit the at least a portion of in-flight entertainment content directly to a corresponding plurality of user devices for user consumption.

16. The method of claim 15, further comprising providing, by the content server, power to the plurality of wireless access points via power-over-ethernet ports.

17. The method of claim 15, further comprising providing, by content server, power to the content loading panel.

18. The method of claim 15, wherein the content server is located in a space that allows air cooling of the content server.

19. The method of claim 15, wherein the plurality of types of portable content storage devices comprises one or more of: a secure digital (SD) device, a solid state drive (SSD) device, a universal serial bus (USB) device, a device coupled to an ethernet connector, or a WiFi-enabled device.

20. The method of claim 15, wherein the content loading panel is installed in a cabin overhead bin structure, a bulkhead structure, or a video control center (VCC) of the aircraft.

* * * * *